UNITED STATES PATENT OFFICE.

JOSEPH MOERLE, OF PHILADELPHIA, PENNSYLVANIA.

BEVERAGE PREPARATION.

SPECIFICATION forming part of Letters Patent No. 418,581, dated December 31, 1889.

Application filed January 25, 1888. Serial No. 261,896. (Specimens.)

*To all whom it may concern:*

Be it known that I, JOSEPH MOERLE, a citizen of the United States, residing in the city and county of Philadelphia, State of Pennsylvania, have invented a new and useful Improvement in Beverage Preparations, which improvement is fully set forth in the following specification.

My invention consists of a beverage preparation of the form of a block or cake which is dry, porous, and readily soluble, the method and means for producing the same being hereinafter fully set forth.

In carrying out my invention I take, first, five pounds of granulated sugar and one pint of water and boil them together at 270° Fahrenheit, making preparation No. 1. I take two ounces of pulverized sugar, one-half of the white of one egg, and twelve drops of the juice of lemon, said juice being a pure acid obtained from the body (flesh and peel) of lemons, and combine them, making preparation No. 2. The two preparations are now united and thoroughly beaten until light and frothy, and the mixture is then poured out on a table, pan, tray, paper, &c., and cut into blocks, cakes, &c., as desired, the article being dry, spongy, or porous, light and ready for use. The white of egg aids in uniting or holding together the other ingredients in the block.

When a piece of the article is placed in water, it quickly dissolves and produces a beverage of superior quality.

The article is readily adapted to be packed in boxes or other receptacles, and can be thus carried from place to place.

Having thus described my invention, what I claim as new, and desire to secure by Letters Patent, is—

The herein-described composition of matter, consisting of two preparations, one of said preparations consisting of granulated sugar and water, in the proportions and prepared as set forth, and the other preparation consisting of pulverized sugar, white of eggs, and the flesh, the juice, and peel of the body of the lemon, in the proportions and prepared as set forth, said preparations being combined as described, forming a dry and porous block, substantially as and for the purpose set forth.

JOSEPH MOERLE.

Witnesses:
JOHN A. WIEDERSHEIM,
JAMES F. KELLY.